United States Patent
Marissen et al.

(10) Patent No.: US 12,454,774 B2
(45) Date of Patent: Oct. 28, 2025

(54) METHOD OF MANUFACTURING MULTIFILAMENT YARNS OF FILLED HIGH-PERFORMANCE POLYETHYLENE (HPPE) FIBERS

(71) Applicant: Avient Protective Materials B.V., Geleen (NL)

(72) Inventors: Roelof Marissen, Echt (NL); Tina Brückner, Echt (NL); Peto Verdaasdonk, Echt (NL); Jozef Siegfried Johannes Homminga, Echt (NL)

(73) Assignee: AVIENT PROTECTIVE MATERIALS B.V., Geleen (NL)

( * ) Notice: Subject to any disclaimer, the term of this patent is extended or adjusted under 35 U.S.C. 154(b) by 164 days.

(21) Appl. No.: 18/244,209

(22) Filed: Sep. 8, 2023

(65) Prior Publication Data

US 2023/0416945 A1   Dec. 28, 2023

Related U.S. Application Data

(62) Division of application No. 16/500,164, filed as application No. PCT/EP2018/058389 on Apr. 3, 2018, now abandoned.

(30) Foreign Application Priority Data

Apr. 3, 2017 (EP) ..................... 17164458

(51) Int. Cl.
| | |
|---|---|
| D06M 15/227 | (2006.01) |
| D01F 1/10 | (2006.01) |
| D01F 6/04 | (2006.01) |
| D02G 3/40 | (2006.01) |
| D02G 3/44 | (2006.01) |
| A41D 19/015 | (2006.01) |

(52) U.S. Cl.
CPC ............ D01F 6/04 (2013.01); D01F 1/10 (2013.01); D02G 3/404 (2013.01); D02G 3/442 (2013.01); D06M 15/227 (2013.01); *A41D 19/01505* (2013.01); *D10B 2321/0211* (2013.01); *D10B 2501/041* (2013.01)

(58) Field of Classification Search
CPC .. D06M 13/535; D06M 11/84; D06M 13/165; D06M 13/17; D06M 2101/32; D06M 11/38; D06M 13/1845; D06M 13/207; D06M 13/292; D06M 15/00; D06M 15/11; D06M 15/233; D06M 15/263; D06M 15/333; D06M 15/53; D06M 15/564; D06M 15/59; D06B 3/10; D06L 1/12; D06L 4/10; D06L 4/12; D06C 11/00

See application file for complete search history.

(56) References Cited

U.S. PATENT DOCUMENTS

| | | | |
|---|---|---|---|
| 5,091,133 A | 2/1992 | Kobayashi et al. | |
| 5,597,649 A * | 1/1997 | Sandor | D02G 3/442 428/370 |
| 5,738,940 A | 4/1998 | Neuert | |
| 5,851,668 A * | 12/1998 | Sandor | D01F 1/10 428/397 |
| 6,127,028 A * | 10/2000 | Sandor | D01F 6/62 428/113 |
| 8,022,160 B2 * | 9/2011 | Dirks | D01F 6/04 528/502 B |
| 8,117,816 B2 * | 2/2012 | Yamamoto | D02G 3/286 57/204 |
| 11,149,122 B2 * | 10/2021 | Marissen | D06M 15/227 |
| 2004/0254286 A1 * | 12/2004 | Hansen | D01F 6/92 525/418 |
| 2010/0229521 A1 | 9/2010 | Yamamoto et al. | |
| 2014/0342109 A1 * | 11/2014 | Mencke | D02G 3/02 428/221 |
| 2015/0093950 A1 * | 4/2015 | Verdaasdonk | D01F 6/04 428/339 |
| 2021/0102313 A1 * | 4/2021 | Marissen | D01F 11/06 |

FOREIGN PATENT DOCUMENTS

| | | |
|---|---|---|
| CN | 106350882 | 1/2017 |
| CN | 108004603 | 5/2018 |
| CN | 108265347 | 7/2018 |

(Continued)

OTHER PUBLICATIONS

International Search Report for PCT/EP2018/058389 dated May 8, 2018, 5 pages.

(Continued)

*Primary Examiner* — William P Fletcher, III

(74) *Attorney, Agent, or Firm* — NIXON & VANDERHYE P.C.

(57) ABSTRACT

Methods of manufacturing multifilament yarns of filled high-performance polyethylene (HPPE) fibers that are formed of HPPE filled with a hard component having a Mohs hardness of at least 2.5 are provided. The methods include applying a solvent solution or an aqueous suspension of a polymeric resin to the filled HPPE fibers and thereafter at least partially drying the solvent solution or aqueous suspension to obtain the yarn. The polymeric resin is a homopolymer of ethylene or propylene or is a copolymer of ethylene and/or propylene, and has a density as measured according to ISO1183-2004 in the range from 860 to 970 kg/m$^3$, a melting temperature in the range from 40 to 140° C. and a heat of fusion of at least 5 J/g.

47 Claims, 1 Drawing Sheet

(56) References Cited

FOREIGN PATENT DOCUMENTS

| | | |
|---|---|---|
| EP | 0 205 960 | 12/1986 |
| EP | 0 845 551 | 6/1998 |
| GB | 2 042 414 | 9/1980 |
| GB | 2 051 667 | 1/1981 |
| JP | 2015-515554 | 5/2015 |
| WO | 99/18156 | 4/1999 |
| WO | 01/73173 | 10/2001 |
| WO | 2008/046476 | 4/2008 |
| WO | 2007/094062 | 7/2009 |
| WO | 2010/089410 | 8/2010 |
| WO | 2011/154383 | 12/2011 |
| WO | 2013/120983 | 8/2013 |
| WO | 2013/131996 | 9/2013 |
| WO | 2013/139784 | 9/2013 |
| WO | 2013/149990 | 10/2013 |
| WO | WO-2017060469 A1 * | 4/2017 .............. C08J 5/046 |

OTHER PUBLICATIONS

Written Opinion of the ISA for PCT/EP2018/058389 dated May 8, 2018, 7 pages.

* cited by examiner

METHOD OF MANUFACTURING MULTIFILAMENT YARNS OF FILLED HIGH-PERFORMANCE POLYETHYLENE (HPPE) FIBERS

CROSS-REFERENCE TO RELATED APPLICATIONS

This application is a divisional of U.S. patent application Ser. No. 16/500,164 filed on Oct. 2, 2019 (now abandoned), which in turn is the U.S. national phase of International Application No. PCT/EP2018/058389 filed Apr. 3, 2018 which designated the U.S. and claims priority to EP Patent Application No. 17164458.6 filed Apr. 3, 2017, the entire contents of each of which are hereby incorporated by reference.

FIELD

The present invention relates to a yarn comprising high performance polyethylene fibers (HPPE) comprising a hard component, the hard component having a Mohs hardness of at least 2.5. Furthermore, the present invention directs to a process to produce said yarn. The present invention also relates to the use of the yarn in various applications.

BACKGROUND AND SUMMARY

Such a yarn is already known, for instance from document WO2008046476. This document discloses a yarn having high cut resistance, the yarn comprising a hard component having a Mohs hardness of at least 2.5, the hard component being a plurality of hard fibers having an average diameter of at most 25 micron. However, the cut resistant yarn disclosed in this document loses hard component leading to large amounts of dust formation during the manufacturing process of the yarn and/or during further processing into different products, e.g. knitting for making gloves. This may lead to higher hardware wear and failure, as well as processing difficulties.

The objectives of the present invention are therefore to provide a yarn that limits or even prevents dust formation during processing of the yarns into articles and also of the articles, which yarn can be made at low cost and environmentally friendly, showing in the same time high cut resistance and versatility for coloring and dyeing.

This objective is achieved by the yarn according to the present invention, the yarn comprising i) high performance polyethylene (HPPE) fibers comprising a hard component, the hard component having a Mohs hardness of at least 2.5 and ii) a polymeric resin, wherein the polymeric resin is a homopolymer of ethylene or propylene or is a copolymer of ethylene and/or propylene, wherein the polymeric resin has a density as measured according to ISO1183-2004 in the range from 860 to 970 kg/m$^3$, a melting temperature in the range from 40 to 140° C. and a heat of fusion of at least 5 J/g.

Surprisingly, it was observed that the yarn according to the present invention limits or even prevents dust formation during processing of the yarns comprising the filled fibers, thus avoiding hardware failure and hazards related to processing. Furthermore, the yarn according to the present invention may be easier to treat with materials of various chemical composition, e.g. by coloring, dyeing and treatment with "grip coatings" and can thus be applied in different applications. In addition, the tendency for fibrilization of the yarn with the added polymeric resin according to the invention is lower than a comparative yarn without the coating. Thus, less buildup of fibril clusters occurs on processing equipment like guiding eyes, or axles over which the body runs. Moreover, the yarn according to the invention and the process to manufacture the yarn may allow easier addition of extra functionalities, like coloring and dyeing.

DETAILED DESCRIPTION

Figure 1:
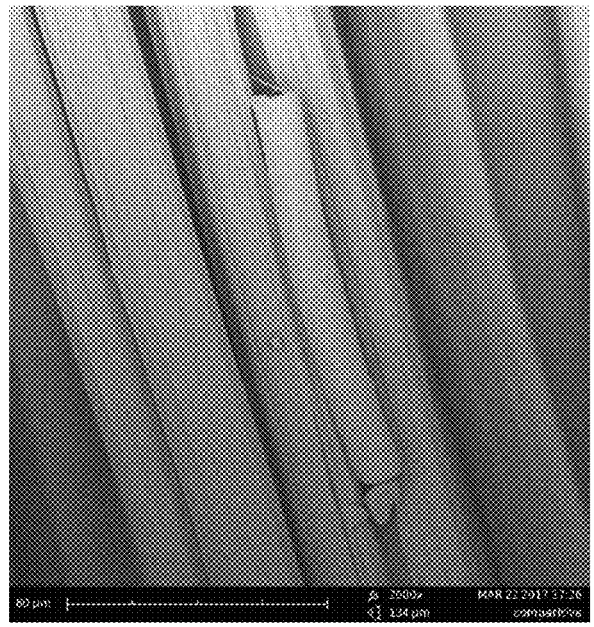
FIG. 1 is an SEM photograph of the yarn A of Comparative Experiment 1 described hereinbelow.

By fiber is herein understood an elongated body, the length dimension of which is much greater than the transverse dimensions of width and thickness. Accordingly, the term fiber includes filament, strip, band, tape, and the like, having regular or irregular cross-sections. The fiber may have continuous lengths, known in the art as filament or continuous filament, or discontinuous lengths, known in the art as staple fibers. A yarn for the purpose of the invention is an elongated body containing many individual fibers. By individual fiber is herein understood the fiber as such. Preferably, the HPPE fibers of the present invention are HPPE tapes, HPPE filaments or HPPE staple fibers.

The HPPE fibers comprising the hard component, with the hard component having a Mohs hardness of at least 2.5, in the yarn according to the present invention may be also referred herein as filled fibers or filled HPPE fibers of HPPE-based fibers. The material in the hard component may have a Mohs hardness of at least 3, preferably at least 3.5, more preferably at least 4, most preferably at least 6. The hard component in the HPPE fibers is preferably distributed, more preferably homogeneously distributed, inside the HPPE fiber body.

By yarn is herein understood an elongated body, especially an elongated body comprising filled fibers and a polymer resin, the yarn having the length dimension of the yarn being much greater than the transverse dimensions of width and thickness. Accordingly, the term yarn includes but is not limited to a fiber, monofilament, multifilament yarn, staple fiber yarn, tape, strip, film, strand, cable, cord, rope, ribbon, hose, tube and the like. Preferably, said length dimension is at least 10 times, more preferably at least 20 times even more preferably at least 50 times and most preferably at least 100 times greater than the width or thickness dimension of the yarn, whichever is larger. Most preferably, the length is substantially continuous, e.g. hundreds of meters. The cross-sectional shape of the yarn may be from round or almost round, oblong or rectangular shape whereby a yarn with a round or almost round cross-section may be but is not limited to filament, fiber, multifilament yarn, staple fiber yarn, strand, cable, cord, rope, hose or tube, while a yarn with oblong to rectangular cross-sections are commonly referred to as a tape, film, ribbon or strip.

The yarn may be comprised of a thread of 2 or more HPPE fibers, which comprise the hard component having a Mohs hardness of at least 2.5, lying side by side without being twisted around each other. Such thread of untwisted said HPPE-based fibers may also be called a bundle and, as elaborated above, may have a variety of cross-sectional shapes. The HPPE-based fibers in a bundle are substantially oriented in a single direction, the length direction of the yarn. Furthermore, a thread may be comprised of two or more twisted HPPE-based fibers, generally referred to as a yarn. Several yarns may be laid in same or different directions to produce a so-called composite bundle or a strand, which again may be aggregated together or in combination with other fiber arrangements to form complex fiber assemblies such as ropes or ribbons. The arrangement of the fibers one to another in the yarn of the invention may be of different types amongst which a parallel, laid, braided or woven fiber or yarn arrangement, or others as may be known to the person skilled in the field.

The hard component in the filled HPPE fibers in the yarn according to the present invention may comprise or consist of a material with a hardness higher than the hardness of the HPPE fibers or of the yarn measured in the absence of the material. Hard components may comprise or consist of organic and/or non-polymeric materials. Preferably, the material comprised in the hard component is a non-polymeric material.

By "non-polymeric material" is herein understood a material that does not contain a polymer. Alternative definition of non-polymeric material used in the present invention is a material essentially not containing hydrogen atoms, i.e. a material that contain hydrogen atoms in an amount of less than 7 mass %, preferably less than 5 mass %, most preferably less than 1 mass %, based on the total mass of the non-polymeric fibers. In particular, non-polymeric material refers to compounds comprising metals, metals alloys, metal oxides, ceramic materials, crystalline materials, and/or mixtures thereof. Suitable metals include tungsten, copper, brass, bronze, aluminum, steel, iron, monel, cobalt, titanium, magnesium, silver, molybdenum, tin and zinc, zirconia; metal oxides include aluminum oxide, silicon oxide, titanium oxide, iron oxides, calcium oxides, magnesium oxides, potassium oxides, phosphorous oxides, manganese oxides and/or combinations thereof; metal carbides, e.g., tungsten carbide; metal nitrides; metal sulfides; metal silicates; metal silicides; metal sulfates; metal phosphates; and metal borides; and/or mixtures thereof. Nonlimiting examples of suitable crystalline minerals include baddeleyite, chloritoid, clinozoisite, chondrodite, euclasite, petalite, sapphire, spodumene, staurolite, clay, silica, silicates, silicon dioxide, carbides, e.g. silicon carbide, carbonates, cyanides and/or mixtures thereof. Suitable ceramic materials include glass and alumina. Allotropes of carbon such as diamond, graphite, graphene, fullerene, carbon nanotubes and/or mixtures thereof can also be used as materials for hard components. Preferably, the hard component comprises a material that is selected from a group consisting of glass, a mineral, such as a material containing a metal oxide and a metal. Yet preferably, the hard component may have a composition that is resorbable in vivo, e.g. when it is glassy, and it preferably contains at most 40 wt % Si, thus being even harmless in case it enters the human body in one way or another.

The hard component may be used in any known shape, size, size distribution, diameter and/or length, as for instance described in document WO2013149990, WO2008046476, U.S. Pat. Nos. 5,738,940A and 5,597,649A, all documents are incorporated herein by reference. For instance, a particulate form of the hard component may be used. For particles of substantially spherical shape, the average particle size is substantially equal to the average particle diameter. For particles of substantially oblong shape, e.g. elongated or non-spherical or anisotropic, such as needles or fibers, the particle size may refer to the average length dimension (L), along the long axis of the particle, whereas the average particle diameter, or in short the diameter as may be also referred herein, refers to the average diameter of the cross-section that is perpendicular to the length direction of said oblong shape. In case the cross-section of the particle is not circular, the average diameter (D) is determined with following formula: $D=1.15*A^{1/2}$, wherein A is the cross-section area of the particle.

The selection of an appropriate particle size, diameter and/or length of the hard component depends on the processing and on the HPPE-based fibers dimension. In case of HPPE-based fibers produced by a spinning process, the hard component should be small enough to easily pass through the spinneret apertures. The particle size and average diameter may be selected small enough to avoid too large deterioration of the fiber tensile properties. The particle size and average diameter may have a log normal distributions.

Preferably, the average diameter (D) of the hard component is at most 50 micron, more preferably at most 30 microns, even more preferably at most 25 microns and even more preferably at most 15 microns and most preferably at most 10 micron. Hard component with lower average diameter may result in more homogeneous articles and may lead to less surface defects in the articles obtained from the lengthy bodies according to the present invention, especially if prepared by extrusion. Higher average diameters lead to more dust formation.

Preferably, the average diameter of the hard component is at least 0.01 micron, more preferably at least 0.1 micron, even more preferably at least 1 micron, most preferably at least 3 micron.

Preferably, the average length (L) of the hard component is at most 10000 microns, more preferably at most 5000 microns, most preferably at most 3000 microns. It was also observed that when the hard component are hard fibers having an average length of at most 1000 microns, more preferably at most 750 microns, most preferably at most 650 microns, the article of the invention and in particular a glove comprising the article of the invention shows a good dexterity. Preferably said average length of said hard fibers is at least 50 microns, more preferably at least 100 microns, most preferably at least 150 micron, yet most preferably at least 200 micron.

The hard component present in the HPPE-based fibers may be hard particles that may have an aspect ratio L/D of about 1. The hard component present in the HPPE-based fibers may be in the form of hard fibers that may have an aspect ratio L/D of higher than 1, preferably of at least 3, preferably at least 5, yet preferably at least 10, more preferably higher than 30. The hard component in the HPPE-based fiber may comprise or consist of hard particles and/or hard fibers.

Any hard component known in the art can be used. Suitable hard components are already commercially available, as used also in the Examples section of this invention. Hard components and methods to add the hard component to the HPPE fiber are well-known to the skilled person in the art and described, for instance, in document WO9918156A1, which is incorporated herein by reference and in WO2008046476, which is incorporated herein by reference, and in WO2013149990, which is incorporated herein by reference.

The aspect ratio of the hard component is the ratio between the length, i.e. average length (L) and the diameter, i.e. average diameter (D) of the hard component. The average diameter and the aspect ratio of the hard component may be determined by using any method known in the art, for instance SEM pictures. For measuring the diameter it is possible to make a SEM picture of the hard component, e.g. hard fibers as such, spread out over a surface and measuring the diameter at 100 positions, ad randomly selected, and then calculating the arithmetic average of the so obtained 100 values. For the aspect ratio it is possible to make a SEM picture of the hard component, e.g. hard fibers and to measure the length of the hard component, e.g. hard fibers that show up at or just below the surface of the HPPE fiber. Preferably the SEM pictures are made with backscattered electrons, providing a better contrast between the hard fibers and surface of the HPPE fiber.

The hard component may be continuous or spun fibers, in particular spun fibers. Suitable examples of spun hard fibers are glass or mineral fibers that may be spun by rotation techniques well known to the skilled person. It is possible to produce the hard fibers as continuous filaments that are subsequently milled into hard fibers of much shorter length. Said milling process may reduce the aspect ratio of at least part of the hard fiber. Alternatively, discontinuous filaments may be produced, e.g. by jet spinning, optionally subsequently milled and used in the yarn of the present invention. The hard fibers may be subjected to a reduction of their aspect ratio during the production process of the HPPE fiber.

Carbon fibers may be used as the hard component. Most preferably, carbon fibers having a diameter of between 3 and 10 microns, more preferably between 4 and 6 microns are used. Articles containing the carbon fibers show improved electrical conductivity, enabling the discharge of static electricity.

The HPPE-based fiber as filament may have a linear density of at most 15 dtex, preferably at most 12 dtex, most preferably at most 10 dtex, as articles comprising such a fiber are very flexible, providing a high level of comfort to the persons that wear the article. The HPPE-based fiber has preferably a titer of at least 5 dtex, more preferably at least 10 dtex. For practical reasons, the titer of these fibers can be at most 10000 dtex, preferably at most 5000 dtex, more preferably at most 3000 dtex. Preferably, the titer of said fibers is in the range of 100 to 10000, more preferably 500 to 6000 and most preferably in the range from 1000 to 3000 dtex, yet most preferably in the range of from 220 to 1760 dtex or from 220 to 725 dtex.

Preferably, the yarn according to the present invention comprises or consists of i) HPPE fibers consisting of a hard component, the hard component having Mohs hardness of at least 2.5; and ii) a polymeric resin, wherein the polymeric resin is a homopolymer of ethylene or propylene or is a copolymer of ethylene and/or propylene, wherein the polymeric resin has a density as measured according to ISO1183-2004 in the range from 860 to 970 kg/m$^3$, a melting temperature in the range from 40 to 140° C. and a heat of fusion of at least 5 J/g.

The HPPE-based fibers in the yarn according to the invention preferably contain of from 0.1 wt. % to 45 wt. % of the hard component, preferably of from 1 wt. % to 35 wt. %, yet preferably of from 2 wt % to 20 wt %, even more preferably of from 2 wt. % to 7 wt. %, based on the total weight of the HPPE-based fibers.

In the context of the present invention, by high performance polyethylene (HPPE) fiber (without the hard component) is understood a fiber that comprises or consists of a polyethylene with a tensile strength of at least 0.5 N/tex, more preferably at least 1 N/tex, yet more preferably at least 1.5 N/tex, more preferably at least 1.8 N/tex, even more preferably at least 2.5 N/tex and most preferably at least 3.5 N/tex. Preferred polyethylene is high molecular weight (HMWPE) or ultrahigh molecular weight polyethylene (UHMWPE). Best results were obtained when the high-performance polyethylene fiber comprise ultra-high molecular weight polyethylene (UHMWPE) and have a tenacity of at least 2.0 N/tex, more preferably at least 3.0 N/tex. The tensile strength is measured according to the METHODS described in the Examples of the present invention.

The HPPE fibers comprising the hard component having a Mohs hardness of at least 2.5 in the yarn according to the present invention may have a tensile strength of at least 0.5 N/tex, more preferably at least 1 N/tex, yet more preferably at least 1.5 N/tex, more preferably at least 1.8 N/tex, even more preferably at least 2.5 N/tex and most preferably at least 3.5 N/tex.

Preferably, the yarn of the present invention comprises HPPE fibers comprising high molecular weight polyethylene (HMWPE) or ultra-high molecular weight polyethylene (UHMWPE) or a combination thereof, preferably the HPPE-based fibers substantially consist of HMWPE and/or UHMWPE and the hard component. The inventors observed largest effect on the tenacity when using HMWPE and UHMWPE. These polymers can be obtained commercially and methods to produce UHMWPE are well-known in the prior art.

In the context of the present invention, the expression 'substantially consisting of' has the meaning of 'may comprise a minor amount of further species' wherein minor is at most 5 wt %, preferably at most 2 wt % of said further species or in other words 'comprising more than 95 wt % of' preferably 'comprising more than 98 wt % of' HMWPE and/or UHMWPE.

In the context of the present invention, the polyethylene (PE) may be linear or branched, whereby linear polyethylene is preferred. Linear polyethylene is herein understood to mean polyethylene with less than 1 side chain per 100 carbon atoms, and preferably with less than 1 side chain per 300 carbon atoms; a side chain or branch generally containing at least 10 carbon atoms. Side chains may suitably be measured by FTIR. The linear polyethylene may further contain up to 5 mol % of one or more other alkenes that are copolymerisable therewith, such as propene, 1-butene, 1-pentene, 4-methylpentene, 1-hexene and/or 1-octene.

The PE is preferably of high molecular weight with an intrinsic viscosity (IV) of at least 2 dl/g; more preferably of at least 4 dl/g, most preferably of at least 8 dl/g. Such polyethylene with IV exceeding 4 dl/g are also referred to as ultra-high molecular weight polyethylene (UHMWPE). Intrinsic viscosity is a measure for molecular weight that can more easily be determined than actual molar mass parameters like number and weigh average molecular weights (Mn and Mw).

The HPPE fibers and the HPPE-based fibers may be obtained by various processes known in the art, for example by a melt spinning process, a gel spinning process or a solid-state powder compaction process, as also described herein.

A method for the production of the HPPE fibers and the HPPE-based fibers may be a solid-state powder process comprising the feeding the polyethylene as a powder between a combination of endless belts, compression-molding the polymeric powder at a temperature below the melting point thereof and rolling the resultant compression-molded polymer followed by solid state drawing. Such a method is for instance described in U.S. Pat. No. 5,091,133, which is incorporated herein by reference. If desired, prior to feeding and compression-molding the polymer powder, the polymer powder may be mixed with a suitable liquid compound having a boiling point higher than the melting point of said polymer. Compression molding may also be carried out by temporarily retaining the polymer powder between the endless belts while conveying them. This may for instance be done by providing pressing platens and/or rollers in connection with the endless belts.

A preferred method for the production of the HPPE fiber used in the present invention comprises feeding the polyethylene to an extruder, extruding a molded article at a temperature above the melting point thereof and drawing the extruded fiber below its melting temperature. If desired, prior to feeding the polymer to the extruder, the polymer may be mixed with a suitable liquid compound, for instance to form a gel, such as is preferably the case when using ultra high molecular weight polyethylene.

In a most preferred method, the HPPE fiber used in the present invention are prepared by a gel spinning process. Suitable gel spinning processes are described in for example GB-A-2042414, GB-A-2051667, EP 0205960 A and WO 01/73173 A1. In short, the gel spinning process comprises preparing a solution of a polyethylene of high intrinsic viscosity, extruding the solution into a solution-fiber at a temperature above the dissolving temperature, cooling down the solution-fiber below the gelling temperature, thereby at least partly gelling the polyethylene solution of the fiber, and drawing the fiber before, during and/or after at least partial removal of the solvent.

In the described methods to prepare HPPE fiber drawing, preferably uniaxial drawing, of the produced fiber may be carried out by means known in the art. Such means comprise extrusion stretching and tensile stretching on suitable drawing units. To attain increased mechanical tensile strength and stiffness, drawing may be carried out in multiple steps. In case of the preferred UHMWPE fiber, drawing is typically carried out uniaxially in a number of drawing steps. The first drawing step may for instance comprise drawing to a stretch factor (also called draw ratio) of at least 1.5, preferably at least 3.0. Multiple drawing may typically result in a stretch factor of up to 9 for drawing temperatures up to 120° C., a stretch factor of up to 25 for drawing temperatures up to 140° C., and a stretch factor of 50 or above for drawing temperatures up to and above 150° C. By multiple drawing at increasing temperatures, stretch factors of about 50 and more may be reached. This results in HPPE fiber, whereby for ultrahigh molecular weight polyethylene, tensile strengths of 1.5 N/tex to 3 N/tex and more may be obtained.

The HPPE-based fibers comprising the hard component present in the yarn according to the present invention can be obtained by applying the same methods as indicated in the present patent application for manufacturing the HPPE fibers, with the difference that the hard component is also added together with the HPPE polymer powder to form a mixture, which is then spun, preferably gel spun, as mentioned herein for the HPPE fibers. For instance, document WO2008046476, which is incorporated herein by reference describes in detail obtaining of filled HPPE fibers, e.g. by a) mixing HPPE polymer powder or polymer granules and the hard component, b) melting or dissolving the polymer, while still mixing the polymer and the hard component and c) spinning a fiber from the mixture obtained in step b).

Preferably, the yarn comprises the polymeric resin ii), wherein the polymeric resin is located throughout the yarn, e.g. impregnated inside the yarn, more preferably the polymeric resin is coating the yarn, most preferably the polymeric resin is coating the yarn at filament level.

Preferably, the polymeric resin is preferably in contact with the surface of the HPPE fibers comprising the hard component, more preferably the polymeric resin has been applied as a coating on the surface of the HPPE fibers comprising the hard component, most preferably the polymeric resin has been applied on the HPPE fibers comprising the hard component as a coating obtained from an aqueous suspension, as the yarn shows very low amount or even no dust formation during processing.

More preferably, the yarn comprises HPPE fibers comprising a hard component, the hard component having a Mohs hardness of at least 2.5, wherein said HPPE fibers comprise a coating on the surface of said HPPE fibers, with the coating comprising or consisting of a polymeric resin, wherein the polymeric resin is a homopolymer of ethylene or propylene or is a copolymer of ethylene and/or propylene, wherein the polymeric resin has a density as measured according to ISO1183-2004 in the range from 860 to 970 kg/m$^3$, a melting temperature in the range from 40 to 140° C. and a heat of fusion of at least 5 J/g.

The yarn according to the present invention can further comprise iii) other fibers, that may be in the form of filaments and/or staple fibers, that are different than the HPPE fibers or the HPPE-based fibers, e.g. different in composition and/or shape, such as non-polymeric fibers, e.g. glass fibers, carbon fibers, basalt fibers, metal wire or thread; and/or natural fibers, e.g. cotton; bamboo; and/or polymeric fibers, e.g. polyamide fibers, such as nylon fibers, elastic fibers, e.g. elastane fibers, polyester fibers; and/or mixtures of these other fibers, that may be present in any ratio. These other fibers can be twisted around the HPPE-based fibers or the other fibers and/or the HPPE-based fibers can be twisted around a metal wire core. These other fibers and constructions of the HPPE-based fibers and other fibers are already known in the art, for instance described in documents WO2008046476 and WO2010089410, incorporated herein by reference.

The yarn according to the present invention can be manufactured by any process known in the art. Preferably, the yarn according to the present invention is manufactured by a process comprising the steps of:
a) providing HPPE fibers comprising or consisting of a hard component, the hard component having a Mohs hardness of at least 2.5;
b) applying a solvent solution or an aqueous suspension of a polymeric resin to the HPPE fibers comprising or consisting of the hard component of step a), during or after step a);
c) at least partially drying the solvent solution or the aqueous suspension of the polymeric resin applied in step b);

to obtain a yarn comprising the filled fibers and the polymeric resin, upon completion of steps a), b) and c);
d) optionally, applying a temperature in the range from the melting temperature of the resin to 153° C. to the yarn of step b) before, during and/or after step c) to at least partially melt the polymeric resin; and
e) optionally applying a pressure and/or a tension to the yarn obtained in step c) before, during and/or after step d) to at least partially compact and/or elongate the yarn, wherein the polymeric resin is a homopolymer of ethylene or propylene or is a copolymer of ethylene and/or propylene, wherein the polymeric resin has a density as measured according to ISO1183-2004 in the range from 860 to 970 kg/m$^3$, a melting temperature in the range from 40 to 140° C. and a heat of fusion of at least 5 J/g.

In one preferred process step of the present invention, an aqueous suspension is applied to the HPPE-based fibers comprising a hard component, the hard component having a Mohs hardness of at least 2.5. Such application of suspension takes place before, during or after the fibers are assembled to form the yarn. By aqueous suspension is understood that particles of the polymeric resin are suspended in water acting as non-solvent. The concentration of the polymeric resin may widely vary and is mainly limited by the capability to formulate a stable suspension of the resin in water. A typical range of concentration is between 0.5 and 60 wt % of polymeric resin in water, whereby the weight percentage is the weight of polymeric resin in the total weight of aqueous suspension. Preferred concentration are between 1 and 40 wt %, more preferably between 2 and 30 wt %, most preferably between 3 and 20 wt %. Further preferred concentrations of the polymeric resin in the dispersion is at least 1; 2; 3; 5; 10; 15; 20 or 25 wt %, based on the total weight of aqueous suspension and at most 30; 40 or 50 wt %, based on the total weight of the aqueous suspension. The suspension or solution may further comprise additives such as ionic or non-ionic surfactants, tackifying resins, stabilizers, anti-oxidants, colorants or other additives modifying the properties of the suspension, the resin and or the prepared yarn.

The polymeric resin present in the applied solution or suspension and ultimately present in the yarn of the present invention is a homopolymer of ethylene or propylene or a copolymer of ethylene and/or propylene, also referred to as polyethylene, polypropylene or copolymers thereof, in the context of the present invention also referred to as polyolefin resin, in other words, the polymeric resin is selected from a group consisting of a homopolymer of ethylene, a homopolymer of propylene, a copolymer of ethylene, and a copolymer of propylene. It may comprise the various forms of polyethylene, ethylene-propylene co-polymers, other ethylene copolymers with co-monomers such as 1-butene, isobutylene, as well as with hetero atom containing monomers such as acrylic acid, methacrylic acid, vinyl acetate, maleic anhydride, ethyl acrylate, methyl acrylate; generally, α-olefin and cyclic olefin homopolymers and copolymers, or blends thereof. Preferably the polymeric resin is a copolymer of ethylene or propylene which may contain as co-monomers one or more olefins having 2 to 12 C-atoms, in particular ethylene, propylene, isobutene, 1-butene, 1-hexene, 4-methyl-1-pentene, 1-octene, acrylic acid, methacrylic acid and vinyl acetate. In the absence of co-monomer in the polymeric resin, a wide variety of polyethylene or polypropylene may be used amongst which high density polyethylene (HDPE), linear low density polyethylene (LLDPE), very low density polyethylene (VLDPE), low density polyethylene (LDPE), isotactic polypropylene, atactic polypropylene, syndiotactic polypropylene or blends thereof.

Furthermore, the polymeric resin may be a functionalized polyethylene or polypropylene or copolymers thereof or alternatively the polymeric resin may comprise a functionalized polymer. Such functionalized polymers are often referred to as functional copolymers or grafted polymers, whereby the grafting refers to the chemical modification of the polymer backbone mainly with ethylenically unsaturated monomers comprising heteroatoms whereas functional copolymers refer to the copolymerization of ethylene or propylene with ethylenically unsaturated monomers. Preferably, the ethylenically unsaturated monomer comprises oxygen and/or nitrogen atoms. Most preferably, the ethylenically unsaturated monomer comprises a carboxylic acid group or derivatives thereof resulting in an acylated polymer, specifically in an acetylated polyethylene or polypropylene. Preferably, the carboxylic reactants are selected from the group consisting of acrylic, methacrylic, cinnamic, crotonic, and maleic, fumaric, and itaconic reactants. More preferably, ethylene acrylic acid (EAA) copolymer, such as the commercially available EAA copolymers sold under the tradename Michemprime®, is the polymeric resin used as this copolymer adheres to HPPE fibers and also to the hard component. Said functionalized polymers typically comprise between 1 and 10 wt % of carboxylic reactant or more. The presence of such functionalization in the resin may substantially enhance the dispersability of the resin and/or allow a reduction of further additives present for that purpose such as surfactants. Preferably, the suspension is substantially free of additives that may act as solvents for the polymeric resin. Such suspension may also be referred to as solvent-free. By solvent is herein understood a liquid in which at room temperature the polymeric resin is soluble in an amount of more than 1 wt % whereas a non-solvent is understood a liquid in which at room temperature the polymeric resin is soluble in an amount of less than 0.1 wt %.

The polymeric resin has a density as measured according to ISO1183-2004 in the range from 860 to 970 kg/m$^3$, preferably from 870 to 970 kg/m$^3$, more preferably from 875 to 920 kg/m$^3$, yet more preferably from 870 to 940 kg/m$^3$, even more preferably from 875 to 910 kg/m$^3$. The inventors identified that polyolefin resins with densities within said preferred ranges provide an improved balance between the mechanical properties of the yarn and the processability of the suspension, especially the dried suspension during the process of the invention.

The polymeric resin is preferably a semi-crystalline polyolefin having a peak melting temperature in the range from 40 to 140° C. and a heat of fusion of at least 5 J/g, measured in accordance with ASTM E793 and ASTM E794, considering the second heating curve at a heating rate of 10 K/min, on a dry sample. Preferably, of the present invention the polymeric resin has a heat of fusion of at least 10 J/g, preferably at least 15 J/g, more preferably at least 20 J/g, even more preferably at least 30 J/g and most preferably at least 50 J/g. The inventors surprisingly found that with the increase heat of fusion the yarn showed improved monofilament like character. The heat of fusion of the polymeric resin is not specifically limited by an upper value, other than the theoretical maximum heat of fusion for a fully crystalline polyethylene or polypropylene of about 300 J/g. The polymeric resin is a semi-crystalline product with a peak melting temperature in the specified ranges. Accordingly, is a reasonable upper limit for the polymeric resin a heat of fusion of at most 200 J/g, preferably at most 150 J/g. Preferably, a peak melting temperature of the polymeric resin is in the range from 50 to 130° C., preferably in the range from 60 to 120° C. Such preferred peak melting temperatures provide a more robust processing method to produce the yarn in that the conditions for drying and/or compaction of the yarn do need less attention while lengthy bodies with good properties are produced. The polymeric resin may have more than one peak melting temperatures. In such case, at least one of said melting temperatures falls within the above ranges. A second and/or further peak melting temperature of the polymeric resin may fall within or outside the temperature ranges. Such may for example be the case when the polymeric resin is a blend of polymers.

The polymeric resin may have a modulus that may vary in wide ranges. A low modulus resin with for example a modulus of about 50 MPa, will provide very flexible lengthy bodies with good strength properties. A high modulus resin with for example a modulus of about 500 MPa may provide lengthy bodies such as monofilaments with improved structural appearance. Each application may have an optimum modulus for the resin, related to the specific demands during the use of the application. The modulus may be measured according to the METHODS in the Examples section of the present invention.

The application of the suspension of the polymeric resin to the HPPE fibers comprising the hard component according to the invention may be done by methods known in the art and may depend amongst others on the moment the suspension is added to the fibers, the nature of the fibers, the concentration and viscosity of the suspension. The suspension may for example be applied to the filled fibers by spraying, dipping, brushing, transfer rolling or the like, especially depending on the intended amount of polymeric resin present in the yarn of the invention. The amount of suspension present in the body may vary widely in function of the intended application of the yarn and can be adjusted by the employed method but also the properties of the suspension. For some applications, low amounts of highly concentrated suspensions are employed to reduce the energy and time need for drying the impregnated yarn. For other applications, a low concentration suspension may be advantageous for example to increase the wetting and impregnation speed with low viscous suspensions. Finally, the aqueous suspension or solution concentration and quantity should be chosen to provide a yarn with the required amounts of polymeric resin that may be present as a coating material to said body.

Once the polymeric aqueous suspension or solvent solution is applied to the HPPE fibers comprising the hard component, the coated filled fibers, preferably the assembly comprising the coated HPPE fibers comprising the hard component, is at least partially dried. Such drying step involves the removal, e.g. the evaporation of at least a fraction of the water or solvent present in the assembly. Preferably the majority, more preferably essentially all solvent or water is removed during the drying step, optionally in combination with other components. Drying, i.e. the removal of water or solvent, may be done by methods known in the art. Typically, the evaporation of water or solvent involves an increase of the temperatures of the yarn up to or above the boiling point of water or solvent. The temperature increase may be assisted or substituted by a reduction of the pressure and or combined with a continuous refreshment of the surrounding atmosphere. Typical drying conditions are temperatures of between 40 and 130° C., preferably 50 and 120° C. Typical pressure during the drying process is atmospheric.

The process of the invention may optionally comprise a step wherein the HPPE-based fibers comprising the polymeric resin are heated to a temperature in the range from the melting temperature of the polymeric resin to 153° C., before, during and/or after the partially drying of the aqueous suspension. Heating of said fibers may be carried out by keeping the fibers for a dwell time in an oven set at a heating temperature, subjecting the impregnated fibers to heat radiation or contacting the body with a heating medium such as a heating fluid, a heated gas stream or a heated surface. Preferably, the temperature is at least 2° C., preferably at least 5° C., most preferably at least 10° C. above the peak melting temperature of the polymeric resin. The upper temperature is at most 153° C., preferably at most 150° C., more preferably at most 145° C. and most preferably at most 140° C., to prevent deterioration of the (strength) properties of the fiber. The dwell time is preferably between 2 and 200 seconds, more preferably between 3 and 100 seconds, most preferably between 4 and 30 seconds. Preferably, the heating of the fibers and/or the yarn of this step overlaps, more preferably is combined with the drying step of the aqueous suspension. It may prove to be practical to apply a temperature gradient to the impregnated fibers whereby the temperature is raised from about room temperature to the maximum temperature of the heating step over a period of time, whereby the HPPE-based fibers will undergo a continuous process from drying of the suspension to at least partial melting of the polymeric resin.

Preferably, the yarn according to the present invention contains more than 65 wt % of UHMWPE, preferably more than 80 wt % of UHMWPE and most preferably more than 90 wt % UHMWPE, whereby the wt % are expressed as mass of UHMWPE to the total mass of the yarn.

The application of an aqueous polymeric suspension whereby the polymeric resin present in said suspension is according to above described embodiments is providing products with improved properties. The use of an aqueous suspension of a polymeric resin as a binder material for HPPE-based fibers, wherein the polymeric resin is a homopolymer of ethylene or propylene or a copolymer of ethylene and/or propylene, wherein the polymeric resin has a density as measured according to ISO1183-2004 in the range from 860 to 940 kg/m$^3$, a peak melting temperature in the range from 40 to 140° C. and a heat of fusion of at least 5 J/g is hence a further embodiment of the present invention.

It is important that the polyolefin resin softens or melts at higher temperatures. So far, such aqueous suspensions of polymeric resins have not yet been applied in combination with HPPE-based fibers. Surprisingly, they provide improved performance in various products especially products comprising oriented UHMWPE-based fibers.

HPPE fibers coated with a polymer having ethylene or propylene crystallinity are described in EP0091547, whereby mono- or multifilament fibers are treated at high temperatures with solutions of the polymer in hydrocarbon solvents at a concentration of up to 12 g/L. However, through such hot solvent treatment, the fibers may contain residual amounts of the employed hydrocarbon solvent negatively affecting fiber properties. Moreover, remnants of hydrocarbon solvents may cause adverse effects on human health. Furthermore, the treatment of the HPPE fiber at high temperature with a hydrocarbon solvent may affect structural properties of the fibers, especially through diffusion of the hydrocarbon solvent and/or polymer into the HPPE filaments. The fiber-polymer interface may be modified by partial etching and dissolution of the HPPE which may affected amongst others the interface as well as the bulk properties of the HPPE fibers. In contrast the present process may be performed at room temperature and employs a non-solvent for the HPPE, i.e. water. Accordingly, the fibers and lengthy bodies produced by the process of the present invention may have a better retention of the structural properties of the HPPE fibers. The fibers may also present a different surface structure amongst which a better discerned HPPE-coating interfaces compared to the fibers treated at high temperature with a hydrocarbon solvent since no hydrocarbon solvent and/or polymer may diffuse into the HPPE fiber. Furthermore, the process and products described in EP0091547 are limited by the amount of polymer present in the hydrocarbon solutions and hence applied to the HPPE fibers. The solutions are limited by their increasing viscosities and high amounts of polymer coating may only be applied by repetition of the coating operation.

The yarn according to the present invention can be colored by using any method known in the art. The coloring process can be done according to WO2013120983 incorporated herein by reference, for instance by adding coloring agents to the dispersion. This may cause a durable coloring of the yarn. A more versatile method may be to apply a dispersion of a functionalized polyethylene, like EAA, thus providing a coating that is more compatible to later coloring processes than a non-coated HPPE fiber comprising the hard component would be. Suitable coloring agents for the present invention may be dyes or pigments, known in the art. Dyes may be conventional ionic dyes i.e., acid or basic dyes, also called reactive dyes, and disperse dyes. Acid dyes contain one or more acidic groups e.g. —$SO_3H$ or a salt thereof e.g. —$SO_3Na$. Common structural types of acid dyes are monoazo and anthraquinone dyes. Basic dyes contain basic groups e.g. —$N(CH_3)_2$ or salts thereof e.g. —$NH(CH_3)_2Cl$. Dyes are typically be soluble in the HPPE fiber comprising the hard component and can be applied by after treatment of said fibers. Pigments are typically not soluble in the HPPE fiber comprising the hard component and may need to be dispersed during spinning.

The invention also relates to the yarn obtained by or obtainable by the method according to the invention. Such yarn comprises i) high-performance polyethylene fibers comprising or consisting of a hard component, the hard component having a Mohs hardness of at least 2.5 and ii) a polymeric resin, wherein the polymeric resin is a homopolymer of ethylene or propylene or is a copolymer of ethylene and/or propylene, wherein the polymeric resin has a density as measured according to ISO1183-2004 in the range from 860 to 970 kg/m$^3$, a melting temperature in the range from 40 to 140° C. and a heat of fusion of at least 5 J/g. Such yarn is subject to the preferred embodiments and potential advantages as discussed above or below in respect of the present inventive method, whereas the preferred embodiments for the yarn potentially apply vice versa for the inventive method.

The present invention further relates to an article comprising the yarn according to the present invention. The article may be selected from a group comprising of fishing lines and fishing nets, ground nets, cargo nets and curtains, kite lines, dental floss, tennis racquet strings, canvas, tent canvas, nonwoven cloths, webbings, pressure vessels, hoses, umbilical cables, electrical, optical fiber, and signal cables, automotive equipment, building construction materials, cut and stab resistant and incision resistant articles, garments, e.g. protective gloves, gloves, aprons, trousers, cuffs, sleeves, composite sports equipment, skis, helmets, kayaks, canoes, bicycles and boat hulls and spars, speaker cones, high performance electrical insulation, radomes, sails and geotextiles. Preferably, the article is a garment, such as a glove.

The invention will be further explained by the following examples and comparative experiment, however first the methods used in determining the various parameters useful in defining the present invention are hereinafter presented.

Methods

Dtex: yarn's or filament's titer was measured by weighing 100 meters of yarn or filament, respectively. The dtex of the yarn or filament was calculated by dividing the weight (expressed in milligrams) by 10.

Heat of fusion and peak melting temperature have been measured according to standard DSC methods ASTM E 794 and ASTM E 793, respectively at a heating rate of 10K/min for the second heating curve and performed under nitrogen on a dehydrated sample.

The density of the polymeric resin is measured according to ISO 1183-2004.

IV: the Intrinsic Viscosity is determined according to method ASTM D1601(2004) at 135° C. in decalin, the dissolution time being 16 hours, with BHT (Butylated Hydroxy Toluene) as anti-oxidant in an amount of 2 g/l solution, by extrapolating the viscosity as measured at different concentrations to zero concentration.

Tensile properties of HPPE fibers: tensile strength (or strength) and tensile modulus (or modulus) are defined and determined on multifilament yarns as specified in ASTM D885M, using a nominal gauge length of the fiber of 500 mm, a crosshead speed of 50%/min and Instron 2714 clamps, of type "Fiber Grip D5618C". On the basis of the measured stress-strain curve the modulus is determined as the gradient between 0.3 and 1% strain. For calculation of the modulus and strength, the tensile forces measured are divided by the titre, as determined above; values in GPa are calculated assuming a density of 0.97 g/cm$^3$ for the HPPE.

Tensile properties of fibers having a tape-like shape: tensile strength, tensile modulus and elongation at break are defined and determined at 25° C. on tapes of a width of 2 mm as specified in ASTM D882, using a nominal gauge length of the tape of 440 mm, a crosshead speed of 50 mm/min.

Tensile strength and tensile modulus at break of the polyolefin resin were measured according to ISO 527-2.

Number of olefinic branches per thousand carbon atoms was determined by FTIR on a 2 mm thick compression moulded film by quantifying the absorption at 1375 cm-1 using a calibration curve based on NMR measurements as in e.g. EP 0 269 151 (in particular pg. 4 thereof).

SEM measurements were made by using Phenom XL Table top SEM micrograph.

Dust formation was determined by knitting samples and positioning a white paper below the samples during the knitting process during 15 minutes.

Cut resistance was determined according to ISO 13997-1999.

Materials

Suspension A was purchased from Michelman under the trade name of Michem® Prime 5931 and is a 28 wt % suspension in water of an acrylate modified polyolefin, i.e. ethylene acrylic acid (EAA) copolymer with a melting peak at 78° C. and a heat of fusion of 29 J/g.

EXAMPLES

Comparative Experiment 1 (CE1)

Yarn A obtained according to Example 1 of WO2013149990 was then knitted into a fabric of 260 grams per square meter (fabric A). The fabric was tested and the results are given in Table 1.

Example 1 (Ex.1)

Yarn A as obtained according to Comparative Experiment 1 was then coated by dipping it in a polyolefin suspension prepared by diluting suspension A with a tenfold amount of water. The wetted yarn was then fed through an oven with a length of 8.4 meters with an inlet speed of 5 m/s and an outlet speed of 6 m/s. The oven temperature was set at 130° C. The obtained dried yarn (yarn B) contained 3.5 wt % polyolefin resin and 96.5 wt % fibrous material. Subsequently, yarn B was knitted into a fabric of 260 grams per square meter (fabric B). The fabric was tested and the results are given in Table 1.

TABLE 1

| Sample | Tenacity of ingredient yarn [cN/dtex] | Cut resistance [N] | Dust formation observations |
| --- | --- | --- | --- |
| Fabric A | 16.8 | 9.2 | Visible dust speckles on white paper |
| Fabric B | 17 | 9.4 | No visible dust speckles on white paper |

Figure 2:
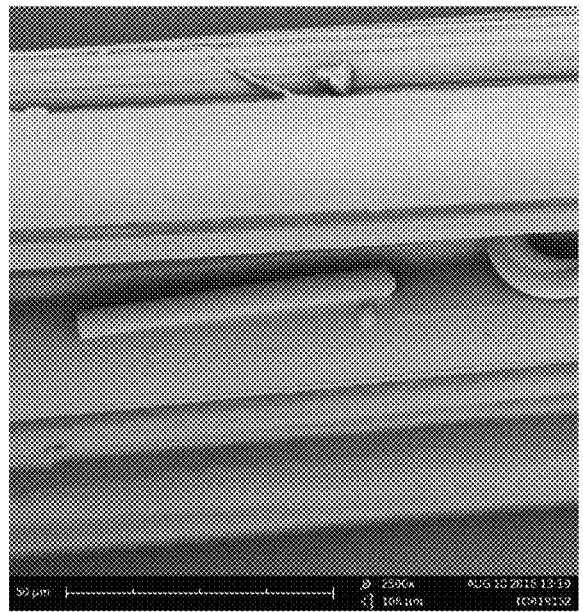
FIG. 2 is an SEM photograph of the yarn B of Example 1 described hereinbelow.

It was observed that dust formation becomes visible as grey speckles during the process of knitting yarn A (Comparative Experiment 1), whereas and no visible dust speckles was observed when knitting 15 minutes with yarn B according to present invention (Example 1). This can also be observed from the SEM pictures shown as FIG. 1 (yarn A of Comparative Experiment 1) and FIG. 2 (yarn B of Example 1). FIG. 1 illustrates a SEM micrograph of filaments (i.e. yarn) containing hard fibers hardly connected to one filament, in the absence of the polymeric resin coating. The base UHMWPE filaments run from up to down at an angle of about 20 degree with the vertical direction. The diameter of the filaments in FIG. 1 is about 30 microns (to be concluded from the scale bar at the bottom, being 60 microns). FIG. 2 shows a SEM micrograph of UHMWPE-based filaments (yarn according to the present invention) with hard fibers connected to one UHMWPE filament comprising a coating, that is visible as a small amount of meniscus shaped solid between the hard fiber and the UHMWPE filament. The base UHMWPE filaments run almost in a horizontal direction. The diameter of the filaments in FIG. 2 is about 30 microns (to be concluded from the scale bar at the bottom, being 50 microns). The polymer resin EAA coating is visible in FIG. 2, but it is surprising that such small amounts can prevent the dust formation. Furthermore, it was observed that by introducing the polymeric resin through the UHMWPE fibers containing the hard component, the tenacity of yarn B and the cut resistance of the fabric formed from the yarn B were maintained at high levels.

The invention claimed is:

1. A method of manufacturing a multifilament yarn comprising filled high-performance polyethylene (HPPE) fibers, the method comprising the steps of:
   (a) providing filled HPPE fibers comprising HPPE filled with a hard component having a Mohs hardness of at least 2.5;
   (b) applying a solvent solution or an aqueous suspension of a polymeric resin to the fibers of step a), wherein the polymeric resin is a homopolymer of ethylene or propylene or is a copolymer of ethylene and/or propylene, wherein the polymeric resin has a density as measured according to ISO1183-2004 in the range from 860 to 970 kg/m$^3$, a melting temperature in the range from 40 to 140° C. and a heat of fusion of at least 5 J/g; and
   (c) at least partially drying the solvent solution or aqueous suspension of the polymeric resin to obtain the yarn comprised of the filled HPPE-based fibers.

2. The method according to claim 1, further comprising the step of:
   (d) subjecting the yarn of step (b) to a temperature in the range from the melting temperature of the resin to 153° C. before, during and/or after step (c) to at least partially melt the polymeric resin.

3. The method according to claim 2, further comprising the step of:
   (e) applying a pressure and/or a tension to the yarn obtained in step (c) before, during and/or after step (d) to at least partially compact and/or elongate the yarn.

4. The method according to claim 1, wherein the polymeric resin is present in the aqueous suspension in a concentration of at most 30 wt. % relative to the total weight of the aqueous suspension.

5. The method according to claim 1, wherein the hard component comprises hard particles and/or hard fibers.

6. The method according to claim 1, wherein the HPPE-based fibers are continuous filaments or staple fibers.

7. The method according to claim 1, wherein the HPPE-based fibers are melt-spun fibers, gel-spun fibers or solid state powder-compacted fibers.

8. The method according to claim 1, wherein the polymeric resin is in contact with surfaces of the filled HPPE fibers.

9. The method according to claim 1, wherein the polymeric resin is a coating on surfaces of the filled HPPE HPPE-based-fibers.

10. The method according to claim 1, wherein the filled HPPE fibers have a tenacity of at least 0.5 N/tex.

11. The method according to claim 1, wherein the filled HPPE fibers have a tenacity of at least 1 N/tex.

12. The method according to claim 1, wherein the filled HPPE fibers have a tenacity of at least 1.5 N/tex.

13. The method according to claim 1, wherein the filled HPPE fibers comprise ultra-high molecular weight polyethylene (UHMWPE).

14. The method according to claim 1, wherein the polymeric resin is present in the yarn in an amount from 1 to 20 wt. % relative to the total weight of the yarn.

15. The method according to claim 1, wherein the polymeric resin has a density from 870 to 930 kg/m$^3$.

16. The method according to claim 1, wherein the polymeric resin comprises an ethylene acrylic acid copolymer.

17. The method according to claim 1, wherein the hard component comprises hard fibers having an average length (L) of at least 50 microns and at most 3000 microns.

18. The method according to claim 1, wherein the hard component comprises hard fibers having an average length (L) of at least 50 microns and at most 750 microns.

19. The method according to claim 1, wherein the filled HPPE fibers have a linear density of at most 15 dtex.

20. The method according to claim 1, wherein the filled HPPE fibers have a linear density of at most 12 dtex.

21. The method according to claim 1, wherein the filled HPPE fibers have a linear density of at most 10 dtex.

22. The method according to claim 1, wherein the hard component comprises hard fibers having an average diameter (D) of at least 1 micron and an aspect ratio Length/Diameter (L/D) of at least 10.

23. The method according to claim 22, wherein the hard fibers have an average diameter (D) of at least 3 microns and at most 25 microns.

24. The method according to claim 22, wherein the hard fibers have an aspect ratio Length/Diameter (L/D) of higher than 30.

25. The method according to claim 1, wherein the hard component comprises a material selected from the group consisting of metal-containing compounds, metal alloys, metal oxides, ceramic materials, crystalline materials and mixtures thereof.

26. The method according to claim 1, wherein the hard component comprises a material having a hardness higher than a hardness of the filled HPPE fibers without the hard component.

27. The method according to claim 1, wherein the yarn comprises more than 65 wt. % of ultrahigh molecular weight polyethylene (UHMWPE), wherein the wt. % is expressed as mass of UHMWPE to the total mass of the yarn.

28. The method according to claim 27, wherein the yarn comprises more than 80 wt. % of the UHMWPE.

29. The method according to claim 27, wherein the yarn comprises more than 90 wt. % of the UHMWPE.

30. The method according to claim 1, wherein the hard component has a Mohs hardness of at least 3.5.

31. The method according to claim 1, wherein the hard component has a Mohs hardness of at least 4.0.

32. The method according to claim 1, wherein the polymeric resin is present in the yarn in an amount from 1 to 20 wt. %, relative to the total weight of the yarn.

33. The method according to claim 1, wherein the polymeric resin is present in the yarn in an amount from 2 to 10 wt. %, relative to the total weight of the yarn.

34. The method according to claim 1, wherein the length dimension of the yarn is at least 100 times greater than the width or thickness dimension of the yarn, whichever is larger.

35. The method according to claim 1, wherein the hard component comprises hard fibers and wherein the hard fibers of the hard component are distributed inside the filled HPPE fibers.

36. The method according to claim 1, wherein the heat of fusion of the polymeric resin is at least 5 J/g and at most 200 J/g.

37. The method according to claim 1, wherein the polymeric resin is located throughout the yarn.

38. The method according to claim 1, wherein the polymeric resin coats the yarn at a filament level.

39. The method according to claim 1, wherein step (a) comprises providing the filled HPPE fibers and other fibers selected from the group consisting of non-polymeric fibers, natural fibers, polymeric fibers other than the filled HPPE fibers and mixtures thereof.

40. The method according to claim 39, wherein the non-polymeric fibers are selected from the group consisting of glass fibers, carbon fibers, basalt fibers, metal wire and metal thread.

41. The method according to claim 39, wherein the polymeric fibers other than the filled HPPE fibers are selected from the group consisting of polyamide fibers, elastic fibers and polyester fibers.

42. The method according to claim 1, wherein the hard component includes fibers selected from the group consisting of glass fibers, mineral fibers and carbon fibers.

43. The method according to claim 1, wherein the hard component comprises allotropes of carbon.

44. The method according to claim 43, wherein the allotropes of carbon include diamond, graphite, graphene, fullerene, carbon nanotubes and/or mixtures thereof.

45. The method according to claim 1, wherein the hard component contains at most 40 wt % Si.

46. The method according to claim 1, wherein the filled HPPE fibers comprise from 1 wt. % to 35 wt. % of the hard component, based on the total weight of the filled HPPE fibers.

47. The method according to claim 1, wherein the filled HPPE fibers comprise from 2 wt. % to 20 wt. % of the hard component, based on the total weight of the filled HPPE fibers.

* * * * *